3,823,197
PROCESS FOR THE PREPARATION OF ALKYL AROMATIC COMPOUNDS

Lucio di Fiore and Benedetto Calcagno, Milan, Italy, assignors to Società Italiana Resine S.I.R. S.p.A., Milan, Italy
Filed Nov. 2, 1972, Ser. No. 303,151
Claims priority, application Italy, Nov. 17, 1971, 31,202/71
Int. Cl. C07c 3/56
U.S. Cl. 260—671 B  8 Claims

ABSTRACT OF THE DISCLOSURE

Friedel-Crafts alkylations to give $C_9$ to $C_{16}$-alkylated benzenes or other hydrocarbons are conducted in a primary alkylation stage and a secondary alkylation stage, spent catalytic complexes of aluminium chloride and hydrocarbons from the first stage being regenerated in the second stage by means of aluminium powder, the amount of chloroalkylic alkylating agent supplied to the second stage preferably being such as to provide from the stoichiometric to 30% over the stoichiometric amount of hydrogen chloride required to convert the aluminium powder to aluminium chloride.

---

Figure 1:
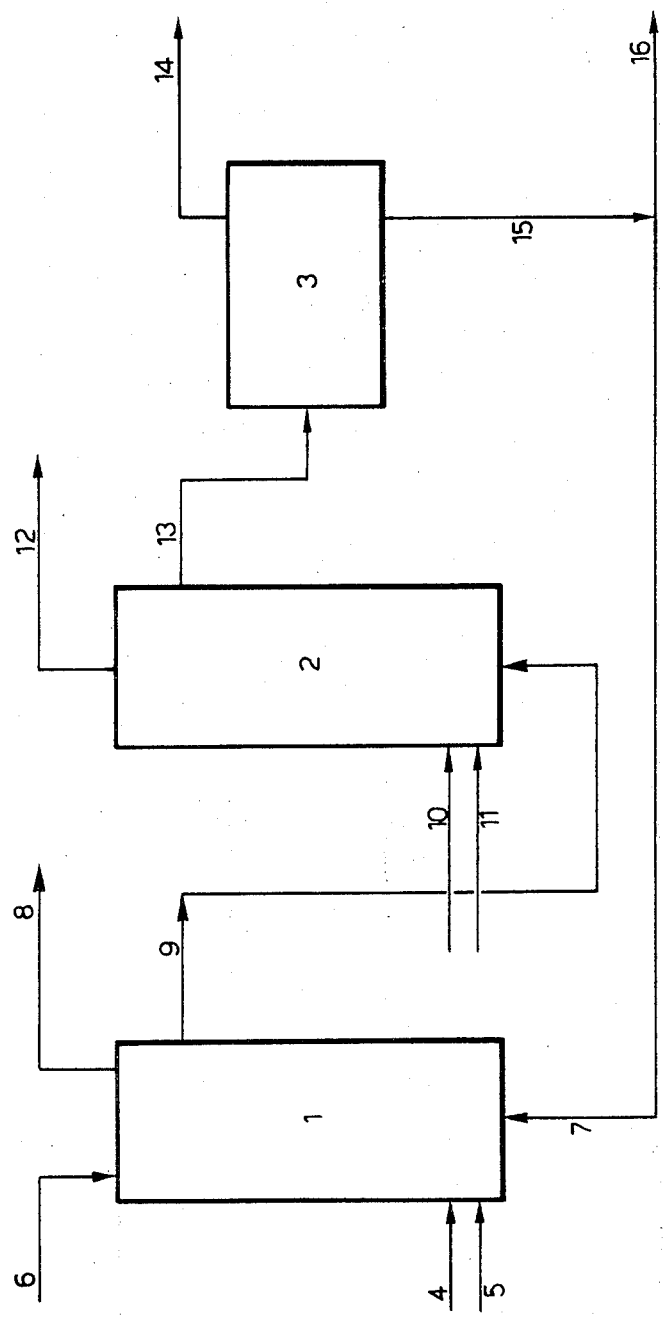

The present invention relates to an improvement in those processes of alkylation of aromatic compounds by means of a halo alkyl alkylating agent in which an aluminium halide is used as a catalyst. More precisely, the invention relates to those processes in which a chloroalkyl agent and an aromatic substrate react in the presence of an aluminium trichloride based catalyst, following the path:

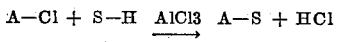

in which

A—Cl is the chloroalkyl alkylating agent
S—H is the aromatic compound
A—S is the alkylated product.

Such processes generally take place in the liquid phase, in the presence of an excess of aromatic substrate which almost always also functions as a solvent, at a temperature comprised between room temperature and the boiling temperature of the aromatic substrate.

Aluminium trichloride is one of the most efficient catalysts in the reactions of aromatic substrate alkylation and for this reason it is the most widely used notwithstanding the difficulties connected with its use.

Even though aluminium trichloride may be added to the alkylation medium in solid form, in the majority of alkylation processes developed in recent years, aluminium trichloride is used in the form of a fluid complex with hydrocarbons.

More particularly, in such alkylation processes, fluid complexes of aluminium trichloride and hydrocarbons are discharged which are bereft of catalytic activity or in which catalytic activity is reduced.

Such spent complexes are activated by the addition of solid powdered aluminium trichloride and are then fed back to the alkylation medium.

The direct use of aluminium trichloride to activate such spent fluid complexes is however not very economical and furthermore aluminium trichloride is a difficult compound to handle.

Therefore, in some recently developed processes, it is preferred continuously to supply powdered aluminium to the alkylation reactor so that aluminium trichloride is formed in situ by reaction of the aluminium with the hydrogen chloride which develops during the alkylation process.

This method is certainly more economical and more easily operated than that in which anhydrous aluminium trichloride is used, in view of the difference in cost and the resistance to humidity which exists between aluminium and its halides.

However, even this procedure is not without its disadvantages, by virtue of the development of hydrogen in the reaction between aluminium and hydrochloric acid. This hydrogen is passed to the hydrogen chloride absorption columns in mixture with the hydrogen chloride which gives rise to the possibility of explosive mixtures forming downstream of such columns.

It is therefore obviously desirable to improve such processes for the alkylation of aromatic substrates by the use of chloroalkyl agents, eliminating the disadvantages inherent in imparting catalytic activity to spent fluid catalytic complexes consisting of aluminium trichloride and hydrocarbons. We have found that the disadvantages described may be eliminated by using the process of the present invention, whereby the reaction between the chloroalkyl compound and the aromatic substrate is carried out by a "primary alkylation phase" and a "secondary alkylation phase," the said primary phase comprising formation of the greater quantity of alkyl aromatic compound together with deactivation of the catalytic complex of aluminium trichloride and hydrocarbons, the said secondary phase comprising the formation of a smaller quantity of alkyl aromatic compound together with the activation of the spent catalytic complex discharged from the primary phase.

The activated aluminium trichloride catalytic complex is then passed from the secondary alkylation phase to the primary phase.

More particularly, the term "primary alkylation phase" is understood as denoting an alkylation process which is carried out at atmospheric pressure and at temperatures comprised between room temperature (approximately 20° C.), and the boiling temperature of the aromatic substrate, in which the reaction between the aromatic substrate and the chloroalkyl alkylating agent is catalysed by an active aluminium trichloride-hydrocarbons catalytic complex.

The term "secondary alkylation phase" is understood as denoting an alkylation process which is carried out under the conditions of temperature and pressure as in the primary phase, in which the reaction between the aromatic substrate and the chloroalkyl alkylating agent occurs in the presence of the spent catalytic complex of aluminium trichloride discharged from the primary phase and powdered aluminium.

In this way, in addition to alkylation of the aromatic substrate in the secondary phase, the reaction takes place between the aluminium and the hydrogen chloride which develops from the alkylation reaction, with a consequent regeneration of the active aluminium trichloride complex.

This catalytic complex is then passed to the primary alkylation phase.

The process of the present invention may be carried out discontinuously or preferably continuously, and is particularly applicable to the formation of linear alkyl benzenes having 9 to 16 carbon atoms in the molecule.

These alkyl benzenes, useful as intermediate products in the synthesis of biologically degradable detergents, are obtained, according to a known process, by partial chlorination with chlorine of linear paraffins having from 9 to 16 carbon atoms per molecule, alkylation of benzene by means of such catalytic products, catalysed by active aluminium trichloride-hydrocarbon complexes and fractional distillation of the products of alkylation after separation of the catalyst.

The process according to the present invention will now be illustrated with reference to the formation of such alkyl benzenes.

In the attached FIG. 1, reference numeral 2 denotes the reactor for the primary alkylation phase while reference numeral 1 denotes the reactor for the secondary alkylation phase.

Benzene is supplied to the reactor 2 through the pipe 10 while the n-chlorinated paraffins are supplied through the pipe 11. The chlorinated paraffins are normally obtained by using gaseous chlorine to chlorinate linear paraffins having from 9 to 16 carbon atoms in the molecule.

In order to obtain a higher yield of mono-chloroparaffins, chlorination is carried out with molar ratios of n-paraffin to chlorine of preferably 3:1 to 2:1.

In this way, a mixture consisting of chlorinated n-paraffins and unaltered n-paraffins is fed to alkylation.

In addition, the rates of supply to 2 are so regulated as to ensure an excess of benzene with respect to the chloroparaffin and more precisely molar ratios of benzene to chloroparaffins of 5:1 to 15:1 are maintained, the preferred ratios being around 10:1.

The products from the reactor 1 are also supplied to the reactor 2 through the pipe 9. These products consist of the products of alkylation in the reactor 1 and the activated complex of aluminium trichloride and hydrocarbons which is produced in this reactor.

In the reactor 2, alkylation is carried out at temperatures ranging from room temperature (approximately 20° C.) up to the temperature at which benzene boils, the dwell times ranging from half to one-and-a-half hours.

The hydrogen chloride is discharged through the pipe 12, while the pipe 13 carries away the products of alkylation which are decanted in the decanter 3. The pipe 14 carries away the alkylate which is washed and subjected to fractional distillation while the pipe 15 carries away the spent catalytic complex of aluminium trichloride. This spent catalytic complex is partly discharged through the pipe 16 and partly fed into the reactor 1 through the pipe 7.

Benzene is supplied to the reactor 1 through the pipe 4 and the chlorinated n-paraffins are supplied through the pipe 5. Powdered metallic aluminium is supplied through the pipe 6. Also in the reactor 1, rates of supply are controlled so that the molar ratio of benzene to chloroparaffins is in the range already defined for alkylation in the reactor 2.

For the process according to the Application, it is furthermore desirable that the quantity of chloroparaffins supplied be such that the hydrogen chloride developed in alkylation is equal to the quantity stoichiometrically necessary to convert aluminium into aluminium trichloride or up to 30% more than the stoichiometric quantity.

In the reactor 1, the working temperature may range from room temperature (approximately 20° C.) up to that at which benzene boils, the dwell time ranging from 10 minutes to 1 hour.

In this way, pipe 8 carries away a gaseous mixture consisting esentially of hydrogen with just small quantities of hydrogen chloride. By proceeding according to the present invention, the best results are obtained when, in the reactor 1, a quantity of aluminium trichloride is formed ranging from 5 to 20% by weight with respect to the quantity of spent catalytic complex recycled through the pipe 7, values around 10% by weight being absolutely preferred. Furthermore, the objects of the present invention are best achieved when the quantity of activated catalytic complex obtained in the secondary stage of alkylation is comprised in the range of values from 1 to 15% by weight with respect to the contents in the primary alkylation reactor 1, values around 3 to 5% by weight being preferred.

According to the process of the present invention, it is possible to separate the activated catalytic complex obtained in the secondary alkylation phase before supplying this complex to the primary reaction phase.

However, in the preferred form, the activated catalytic-complex is supplied to the primary alkylation phase together with the other products of alkylation, as indicated in the attached FIG. 1. According to the process of the present invention, catalytic complexes of aluminium trichloride and hydrocarbons are obtained which are highly active in the processes of alkylation of aromatic compounds by means of chloroalkyl alkylating compounds.

Such active complexes are obtained from metallic aluminium, which constitutes a product available at low cost and more easily handled than aluminium trichloride. Furthermore, proceeding according to the present invention avoids the dangers of some processes of the prior art, which reside in the formation of explosive mixtures downstream of the columns for precipitating the hydrogen chloride originating from the alkylation process.

The process of the present invention has been described mainly in relation to the alkylation of benzene with chlorinated n-paraffins in the formation of alkyl benzenes which may be used as a raw material for biologically degradable detergents. It is however obvious that the process described may be used for alkylating mononuclear aromatic compounds other than benzene or polynuclear aromatic compounds, by means of any type of chloroalkyl compound of generally an halogen derivative capable of giving rise to Friedel-Crafts reactions.

EXAMPLE

Figure 2:
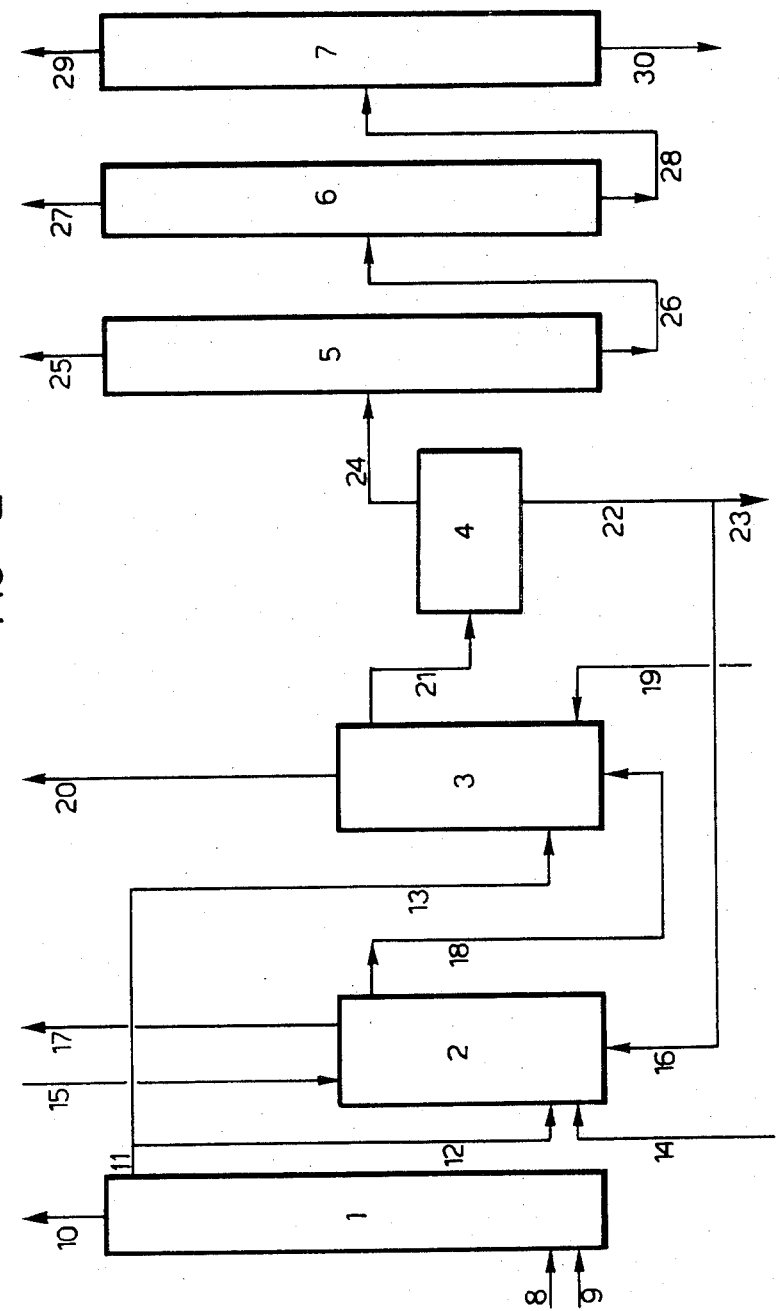

Referring to the attached FIG. 2, 1200 kg./hr. of n-paraffins are supplied through the pipe 8 to the bottom of the chlorination reactor 1 which is in the form of an elongated cylinder.

The n-paraffins are of the following compositions, determined by gas chromatographic analysis: n-C10: 10.3%; n-C11:38.2%; n-Cl12:28.9%; n-Cl13:15.4%; n-C14:7.2% by weight.

Such paraffins have an average molecular weight equal to approximately 166, while the average number of carbon atoms per molecule is equal to approximately 11.7.

The paraffins supplied to the reactor 1 consist of approximately 71% recycled paraffins while the remaining 29% consists of fresh paraffins.

Through the pipe 9, approximately 153 kg./hr. of gaseous chlorine are supplied to the bottom of the reactor 1. Chlorination is carried out at approximately 110° C., the temperature being regulated by means of heat exchangers.

Hydrogen chloride is discharged through the pipe 10, while the mixture of chlorinated n-paraffins and unaltered n-paraffins is discharged through the pipe 11 and passed partly to the secondary alkylation reactor 2 (225 kg./hr.) through the pipe 12, the remainder being supplied to the primary alkylation reactor 3 through the pipe 13.

Approximately 675 kg./hr. of benzene are fed to the reactor 2 through the pipe 14 and approximately 2.7 kg./hr. of powdered metallic aluminium are supplied through the pipe 15. Finally, approximately 135 kg./hr. of the deactivated fluid complex of aluminium trichloride and hydrocarbons emanating from the decanter 4 are fed to the reactor 2 through the pipe 16.

In the secondary alkylation phase, a temperature of 70° C. and the dwell time of one hour are employed. In addition, the reactor 2 is fitted with an effective agitator.

Through the pipe 17, the hydrogen is discharged together with small quantities of hydrogen chloride, while the products of alkylation, together with the activated fluid complex, are discharged through the pipe 18 and are passed to the primary alkylation reactor 3.

Also approximately 1350 kg./hr. of benzene are fed to the reactor 3 through the pipe 19.

In 3, the working temperature of 70° C., and the dwell time is equal to one hour.

Gaseous hydrogen chloride is discharged through 20, while the products of alkylation are discharged through 21 and are subjected to decantation in 4.

In this way, through the pipe 22, the spent catalytic complex is separated and is partly discharged through the pipe 23 and partly recycled to the reactor 2 through the pipe 16.

The alkylate discharged through the pipe 24 is washed with an aqueous soda solution and then with water until neutral, after which it is subjected to distillation.

Column 5 is operated to yield benzene as distillate, which is discharged through line 25. The heavy fraction is discharged from the bottom of the column and transferred through line 26 to a column 6 in which n-paraffins are distilled off and discharged through the line 27. Benzene and paraffins recovered in this manner are recycled to alkylation and chlorination stages, respectively; preferably, the n-paraffins are recycled after a conventional acid treatment to eliminate impurities therefrom. The bottom product of column 6 is transferred through line 28 to a column 7 in which alkylbenzenes are distilled off (about 420 kg./hr.) and discharged through line 29; the "heavies" are discharged from the bottom of the column 7 through line 30 (at a rate of about 70 kg./hr.).

What we claim is:

1. In alkylation processes for the production of linear alkyl benzenes by partial chlorination of linear paraffins having 9 to 16 carbon atoms per molecule, wherein alkylation of benzene by means of such chlorinated paraffins is catalysed by fluid complexes of aluminium trichloride and hydrocarbons and the products of alkylation are fractionally distilled after separation of the spent catalytic complex, the improvement comprising:

in a primary alkylation phase, bringing into contact a first portion of the chlorinated linear paraffins, a first portion of the benzene and an active catalytic complex of aluminium trichloride and hydrocarbons, working at atmospheric pressure, working at temperatures ranging from room temperature up to the boiling temperature of benzene, and applying dwell times of half to one-and-a-half hours;

separating the spent catalytic complex of aluminium trichloride and hydrocarbons from the products of alkylation discharged from the aforesaid primary alkylation phase;

in a secondary alkylation phase, bringing into contact a second portion of the benzene and a second portion of the chlorinated linear paraffins with powdered aluminium and with the spent catalytic complex of aluminium trichloride and hydrocarbons discharged from the primary alkylation phase, working at atmospheric pressure, working at temperatures ranging from room temperature up to the boiling temperature of benzene and for periods ranging from 10 minutes to 1 hour, and transferring the product of the secondary alkylation phase including the activated catalytic complex of aluminium trichloride and hydrocarbons from the secondary alkylation phase to the primary alkylation phase, the quantity of chlorinated paraffins in said second portion being such that the hydrogen chloride developed in the secondary phase is equal to the quantity stoichiometrically necessary to convert the metallic aluminium into aluminium trichloride or is up to 30% greater than the stoichiometric quantity.

2. Process according to Claim 1, characterised in that in the primary alkylation phase and in the secondary phase, molar ratios of benzene to chloroparaffins of 5:1 to 15:1 are maintained.

3. Process according to Claim 2, characterised in that the said ratios are around 10:1.

4. Process according to Claim 1, characterised in that in the secondary alkylation phase, there is formation of a quantity of aluminium trichloride ranging from 5 to 20% by weight of the spent catalytic complex supplied to the said phase.

5. Process according to Claim 4, characterised in that the said quantity is around 10% by weight.

6. Process according to Claim 1, characterised in that the quantity of activated catalytic complex formed in the secondary phase of alkylation is comprised between 1 and 15% by weight with respect to the weight of the products in the primary alkylation phase.

7. Process according to Claim 6, characterised in that the said quantity is from 3 to 5% by weight.

8. In a process for the alkylation of an aromatic compound by means of a chloroalkylic alkylating agent in the presence of catalysts consisting of fluid complexes of aluminium trichloride and hydrocarbons, the improvement comprising:

in a primary alkylation phase, bringing a first portion of the aromatic compound into contact with a first portion of the chloroalkylic alkylating agent and an active catalytic complex of aluminium trichloride and hydrocarbons, and by working at atmospheric pressure and at temperatures ranging from room temperature to the boiling temperature of the aromatic compound;

separating the spent catalytic complex of aluminium trichloride and hydrocarbons from the products of alkylation discharged from the said primary phase;

in a secondary alkylation phase bringing a second portion of the aromatic compound into contact with a second portion of the chloroalkylic alkylating agent, with powdered aluminium and with the spent catalytic complex of aluminium trichloride and hydrocarbons discharged from the primary alkylation phase, while working at atmospheric pressure and at temperatures ranging from room temperature to the boiling temperature of the aromatic compound;

transferring the product of the secondary alkylation phase including the activated catalytic complex of aluminium trichloride and hydrocarbons from the secondary alkylation phase to the primary alkylation phase.

References Cited

UNITED STATES PATENTS

| | | | |
|---|---|---|---|
| 3,433,846 | 3/1969 | Adams et al. | 260—671 B |
| 3,355,508 | 11/1967 | Moulden | 260—671 B |
| 3,391,210 | 7/1968 | Feighner et al. | 260—671 B |
| 3,478,118 | 11/1969 | Sorgent | 260—671 B |

CURTIS R. DAVIS, Primary Examiner